(12) United States Patent
Steele et al.

(10) Patent No.: US 6,253,325 B1
(45) Date of Patent: Jun. 26, 2001

(54) APPARATUS AND METHOD FOR SECURING DOCUMENTS POSTED FROM A WEB RESOURCE

(75) Inventors: Douglas W. Steele, Fort Collins; Todd M. Goin, Loveland; Craig W. Bryant, Fort Collins, all of CO (US)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 09/060,875

(22) Filed: Apr. 15, 1998

(51) Int. Cl.[7] .................................................. G06F 11/30
(52) U.S. Cl. ............................................................ 713/201
(58) Field of Search ................................... 713/200, 201, 713/202, 185, 172, 165

(56) References Cited

U.S. PATENT DOCUMENTS

| | | | |
|---|---|---|---|
| 5,657,388 | * | 8/1997 | Weiss ..................................... 713/185 |
| 5,706,349 | * | 1/1998 | Aditham et al. ....................... 713/159 |
| 5,787,175 | * | 7/1998 | Carter .................................... 713/165 |
| 5,850,442 | * | 12/1998 | Muftic .................................... 705/65 |
| 5,903,878 | * | 5/1999 | Talati et al. ............................. 705/26 |
| 5,987,232 | * | 11/1999 | Tabuki ................................... 713/201 |
| 6,049,877 | * | 4/2000 | White ..................................... 713/201 |

* cited by examiner

*Primary Examiner*—William Grant
*Assistant Examiner*—Ronald Hartman, Jr.

(57) ABSTRACT

An apparatus and method provide flexible and heightened security for accessing web resources with a client browser, where the web resources are on a server. In particular, the apparatus and method are accomplished by having the client browser generate a token that is provided to a security server to provide third party validation of a client request for service. The client browser then makes a call for service, and includes the token as a argument of the call. A CGI-BIN program that receives the call for service also receives the service identifier and arguments, among which is the client user interface generated token. The CGI-BIN program establishes a connection to the security server, and then sends the token received as an argument to the security server for third-party verification. If the token is verified by the security server, then the CGI-BIN program executes the requested service program.

20 Claims, 8 Drawing Sheets

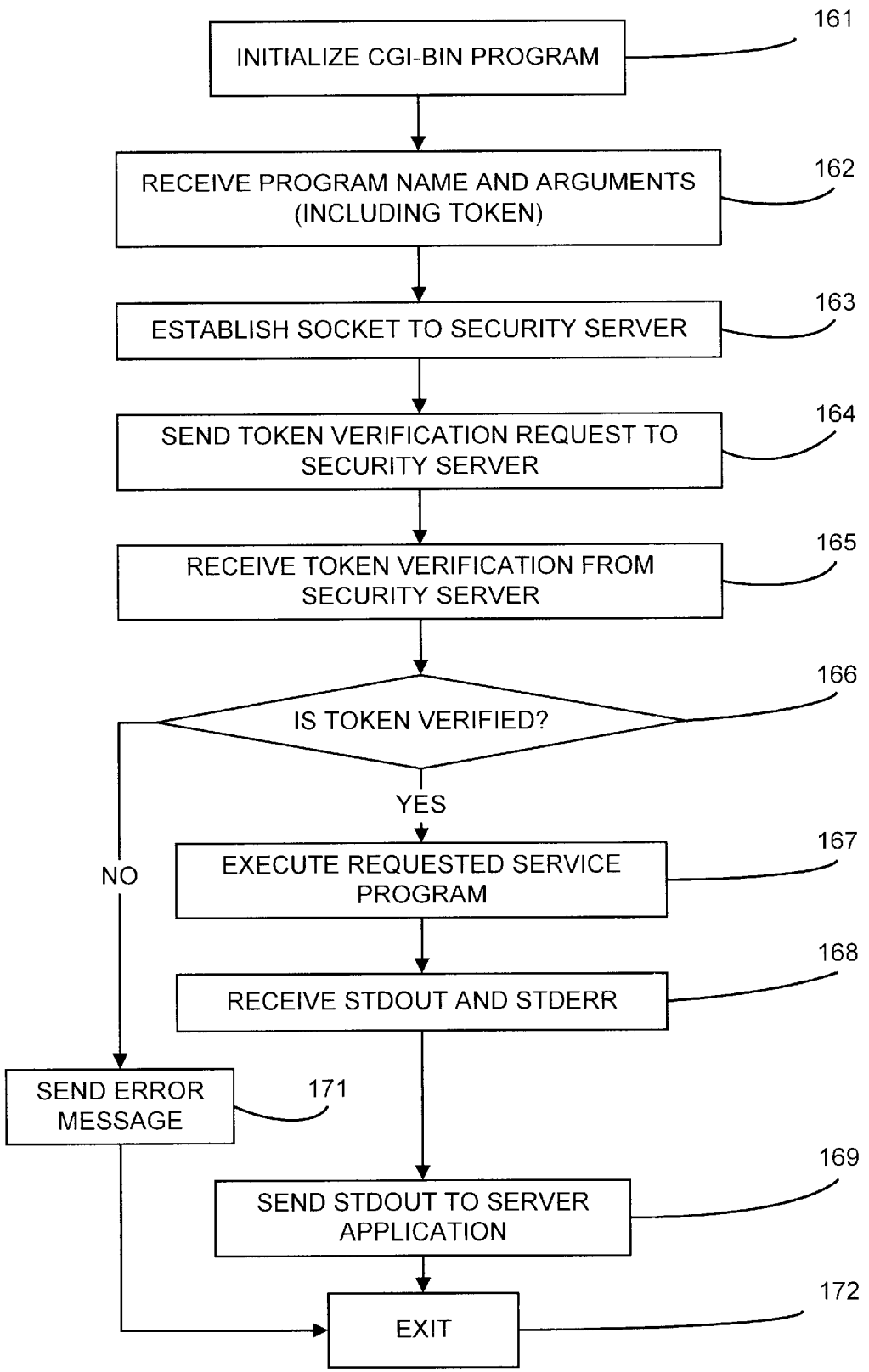

APPARATUS AND METHOD FOR SECURING DOCUMENTS POSTED FROM A WEB RESOURCE

BACKGROUND OF THE INVENTION

1. Field of the Invention

The present invention generally relates to computers and software, and more particularly, to security involved in accessing a web resource on a server with a client browser.

2. Description of Related Art

As known in the art, the Internet is a world-wide collection of networks and gateways that use the TCP/IP suite of protocols to communicate with one another. At the heart of the Internet is a backbone of high speed data communication lines between major nodes or host computers consisting of thousands of commercial government educational and other computer systems that route data and messages.

World Wide Web (WWW) refers to the total set of interlinked hypertext documents residing on hypertext transfer protocol (HTTP) servers all around the world. Documents on the WWW, called pages or web pages, are written in hypertext mark-up language (HTML) identified by uniform resource locators (URL) that specify the particular machine and pathname by which a file can be accessed and transmitted from node to node to the end user under HTTP. A web site is a related group of these documents and associated files, scripts, subprocedures, and databases that are served up by an HTTP server on the WWW.

Users need a browser program and an Internet connection to access a web site. Browser programs, also called "web browsers," are client applications that enable a user to navigate the Internet and view HTML documents on the WWW, another network, or the user's computer. Web Browsers also allow users to follow codes called "tags" imbedded in an HTML document, which associate particular words and images in the document with URLs so that a user can access another file that may be half way around the world, at the press of a key or the click of a mouse.

These files may contain text (in a variety of fonts and styles), graphic images, movie files, and sounds as well as java applets, perl applications, other scripted languages, active X-controls, or other small imbedded software programs that execute when the user activates them by clicking on a link. Scripts are applications that are executed by a HTTP server in response to a request by a client user. These scripts are invoked by the HTTP daemon to do a single job, and then they exit.

One type of script is a common gateway interface (CGI) script. Generally, a CGI script is invoked when a user clicks on an element in a web page, such as a link or image. CGI scripts are used to provide interactivity in a Web page. CGI scripts can be written in many languages including C, C++, and Perl. A CGI-BIN is a library of CGI scripts applications that can be executed by a HTTP server.

A key difficulty with access to these documents and associated files, scripts, subprocedures, and databases that are served up by an HTTP server on the WWW is that of security. How does one ensure that only allowed users from allowed client systems are permitted access to the server application and also ensure that access cannot be perverted to malicious purposes?

The method currently being used involves use of a "cookie." Cookies are blocks of data that a server returns to a client in response to a request from the client. The block of data is then stored on a client's system. When the client returns to the same web site, the client sends a copy of the cookie back to the server, thereby identifying the client to the server. Cookies are used to identify users, to instruct the server to send a customized version of the requested web page, to submit account information for the user, and for other administrative purposes. On most systems, a cookie program is run during user logon.

The prior solution for providing security when accessing web resources suffers from the following security weaknesses. It will be shown later how the present invention addresses and overcomes certain of these difficulties.

A problem with the prior solutions is that the host addresses and user names (i.e., user logon information) are sent in plain text that is very open to "spoofing". A knowledgeable hacker can transmit packets pretending to be from another machine or another user to thereby gain unauthorized access to the server.

Yet another problem arises when multiple levels of user security are attempted. The cookie method only allows a single level of security. Moreover, the use of cookies does not allow for a user application to be integrated with a security system. Currently, cookies are part of the client browser program and are separate from a user application.

Another problem in the prior art is that the authentication is weak. This is because the server accepts the user and host name as identified in the transmission without proof. Furthermore, there is a problem in that no state is maintained since each command transaction stands alone. This leaves these methods open to "replay attacks" wherein a hacker captures a valid network packet, alters some details (like the name of the user or the command to execute) and resends it.

However, until now, network systems have lacked the ability to provide flexible and heightened security for web documents on the Internet or other types of networks.

SUMMARY OF THE INVENTION

Certain objects, advantages, and novel features of the invention will be set forth in part in the description that follows and in part will become apparent to those skilled in the art upon examination of the following or may be learned with the practice of the invention. The objects and advantages of the invention may be realized and obtained by means of the instrumentalities and combinations particularly pointed out in the appended claims.

To achieve the advantages and novel features, the present invention is generally directed to an apparatus and method for providing flexible and heightened security for accessing web resources with a client browser, where the web resources are on a server.

In accordance with one embodiment of the present invention, a client user interface (browser) generates a token. That token is sent to a security server to provide third party validation of a client user request for service. The client user interface then makes a call to a server application for service, and the client user interface sends with the call to the server application the token as an argument of the call for service.

The server application receives the request for service from the client user interface and then performs its own login authorization of the client user. If the authorization is okay, then it performs a call to the required CGI-BIN application program for the requested service.

The CGI-BIN program called for the requested service receives the requested service identifier and arguments among which is the client user interface generated token.

The requested program establishes a connection to the security server, and then sends the token received as an argument to the security server for verification.

The security server receives the token for verification from the requested program and verifies the token received from the requested program with the token received from the client user interface. If the tokens match, then the security server returns to the requested program the indication that the token is verified. Upon verifying a token for a requested user program, the security server returns to the state of waiting to receive a token from a client user interface.

The requested program then executes the requested program and sends the output to the server application before exiting. The server application receives the output from the requested program and returns the data to the client user interface (browser) for display to the client user at which point the server application returns back to the state of waiting for a request for service from a client user interface.

In accordance with another embodiment of the present invention, multiple levels of user security and are implemented for protection of web resources.

In accordance with yet another embodiment of the present invention, an apparatus and method for implementing and securing web resources provide for a user application integrated security system.

BRIEF DESCRIPTION OF THE DRAWINGS

The accompanying drawings incorporated in and forming a part of the specification illustrate several aspects of the present invention, and together, with the description, serve to explain the principles of the invention. In the drawings:

FIG. 8 is a flow chart of the process for the CGI-BIN program process of the present invention, as shown in FIG. 4.

DETAILED DESCRIPTION OF THE PREFERRED EMBODIMENT

The present invention will now be described in detail with specific reference to the drawings. While the invention will be described in connection with these drawings, there is no intent to limit it to the embodiment or embodiments disclosed therein. On the contrary, the intent is to cover all alternatives, modifications, and equivalents included within the spirit and scope of the invention as defined by the appended claims.

Figure 1:
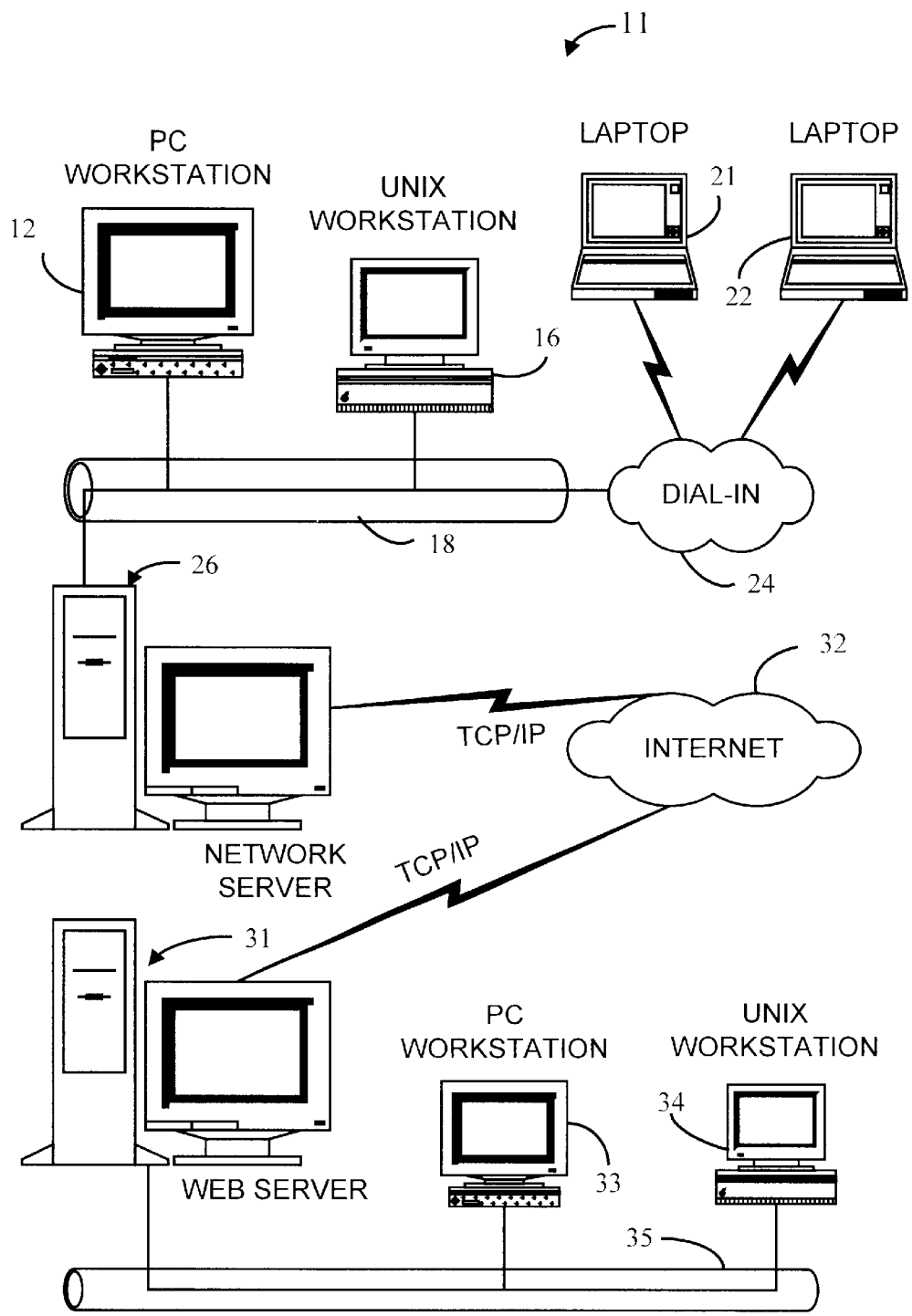
FIG. 1 is a block diagram of the client/server system utilizing the Internet.

Turning now to the drawings, FIG. 1 is a block diagram of just one system configuration that illustrates the flexibility, expandability, and platform independence of the present invention. While the system configuration could take many forms, the diagram of FIG. 1 illustrates a plurality of diverse workstations 12, 14 and 16 directly connected to a network, for example, but not limited to, a LAN 18. Additional workstations 21, 22 may similarly be remotely located and in communication with the network 18 through a dial-in or other connection 24. Each of the workstations in FIG. 1 are uniquely illustrated to emphasize that workstations may comprise a diverse hardware platform.

As is well known, browser applications are provided and readily available for a variety of hardware platforms. Browsers are most commonly recognized for their utility for accessing information over the Internet 32. As aforementioned, a browser is a device or platform that allows a user to view a variety of service collections. The browser retrieves information from a web server 31 or network server 26 using HTTP, then interprets HTML code, formats, and displays the interpreted result on a workstation display.

Additional workstations 33 and 34 may similarly be located and in communication with the web servers 31 for access to web pages on the local server and the Internet. Workstations 33 and 34 communicate with the web server 31 on a LAN network 35. Networks 18 and 35 may be, for example, Ethernet type networks, also known as 10 BASE 2, 10 BAS 5, 10 BSAF, 10 BAST, BASE BAN network, CO-EX cable, and the like.

Figure 2:
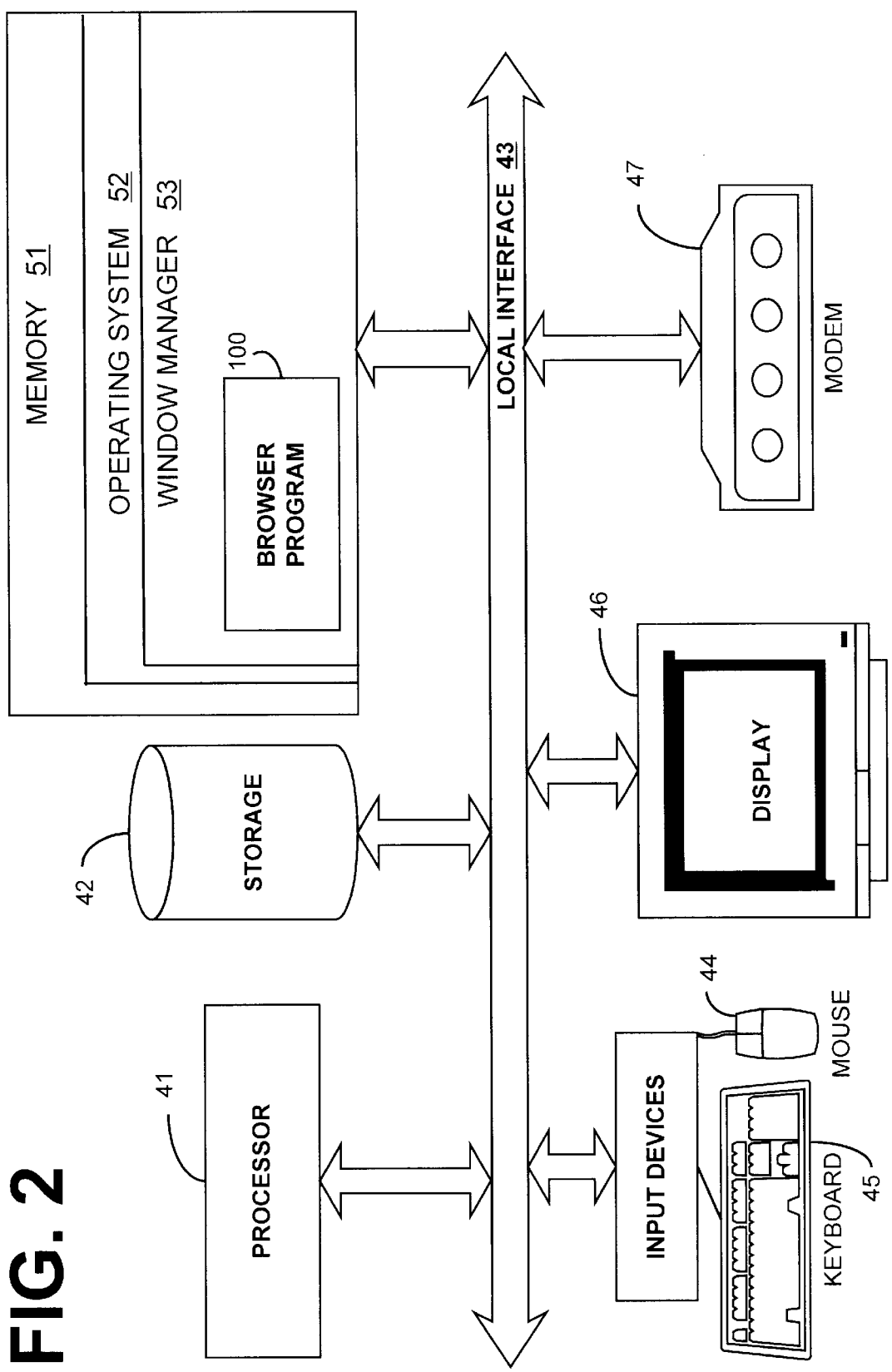
FIG. 2 is a block diagram illustrating a browser program situated within a computer readable medium, for example, in a computer system of the client systems.

As illustrated in FIG. 2 client systems today generally include only a browser program 100 (e.g., Netscape, Internet Explorer, or other browser program) for use in accessing locations on a network 11. These browser programs 100 reside in computer memory 51 and access communication facilities modem 47 to transport the user to other resources connected to the network 11. In order to find a resource, the user should know the network location of the resource denoted by a network location identifier or URL. These identifiers are often cryptic, following very complex schemes and formats in their naming conventions.

Systems today identify, access, and process these resources desired by a user by using the processor 41, storage device 42, and memory 51 with an operating system 52 and window manager 53. The processor accepts data from memory 51 and storage 42 over the bus 43. Direction from the user can be signaled by using the input devices mouse 44 and keyboard 45. The actions input and result output are displayed on the display terminal 46.

The first embodiment of the present invention involves the browser program 100. The browser program 100 is the software that interacts with the server to obtain the requested data and functionality requested by the client user. The client browser program 100 will be described hereafter in detail with regard to FIGS. 4 and 5.

Figure 3:
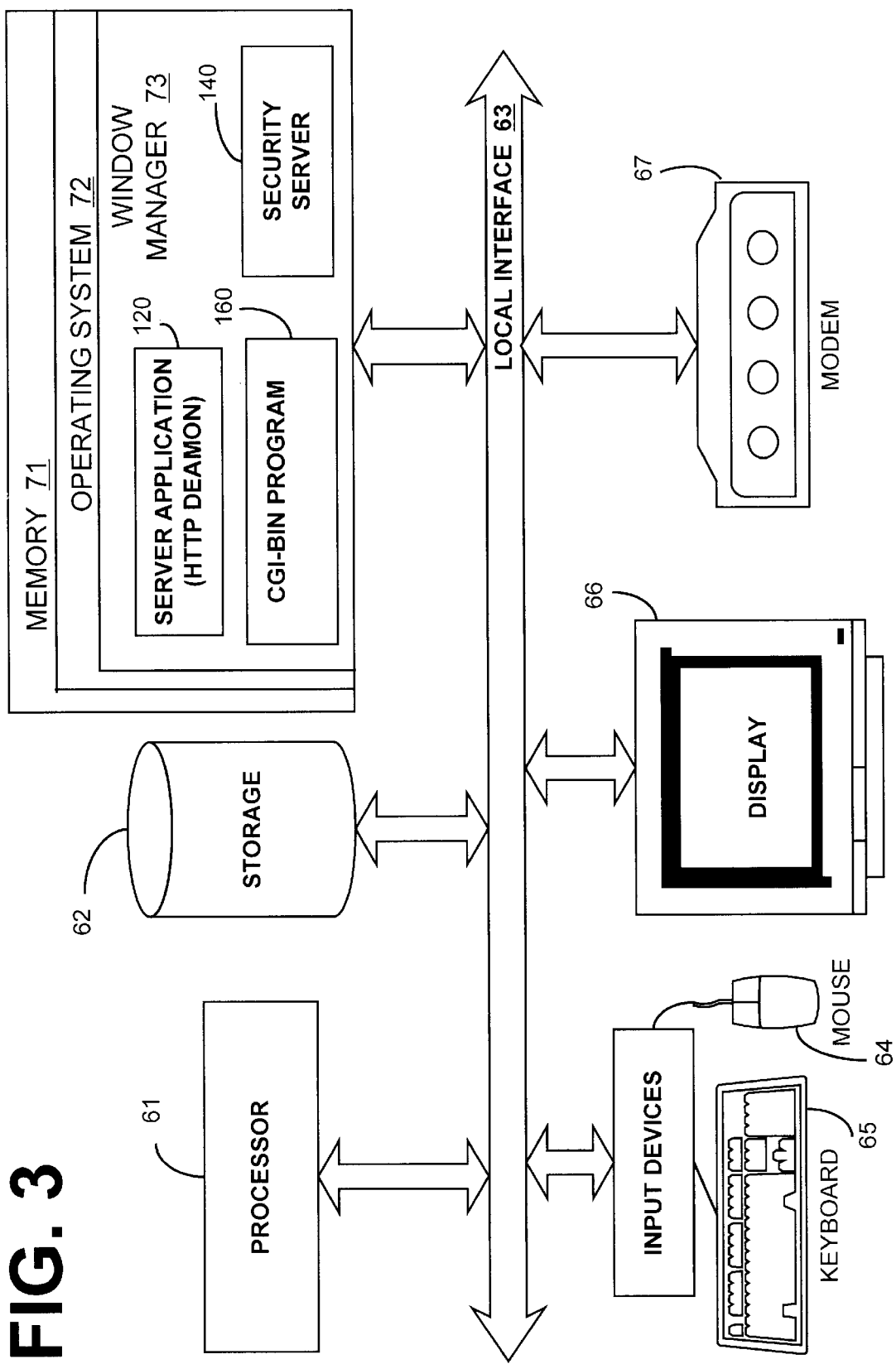
FIG. 3 is a block diagram illustrating a server's service application program, the CGI-BIN program and the security server situated within a computer readable medium, for example, in a computer system of the server systems.

Illustrated in FIG. 3 is the architecture of the server system 26 and 31. The principal difference between the servers 31 and 26 and the clients 12, 16, 21, 22, 33 and 34, illustrated in FIG. 1, are that the client systems interface to the user and request the functionality through the browser program 100, while the servers 26 and 31 provide the services requested by the client systems utilizing the server application program 120, the security server 140, and CGI-BIN program 160.

Otherwise, the functionality of processor 61, storage 62, mouse 64, keyboard 65, display 66, and modem 67 are essentially the same as corresponding items of FIG. 2 described above. As known in the art, the client systems 12, 14, 16, 21, 22, 33 and 34, and server systems 26 and 27, may reside on the same physical machine.

The principal difference in the server is that the memory 71 interacting with the operating system 72 and the window manager 73 provide the services requested by the client utilizing the server application 120, CGI-BIN program 160, and security server 140. Server application 120, CGI-BIN program 160, and security server 140 will herein be defined in more detail with regard to FIG. 4 and FIGS. 6, 7 and 8.

Figure 4:
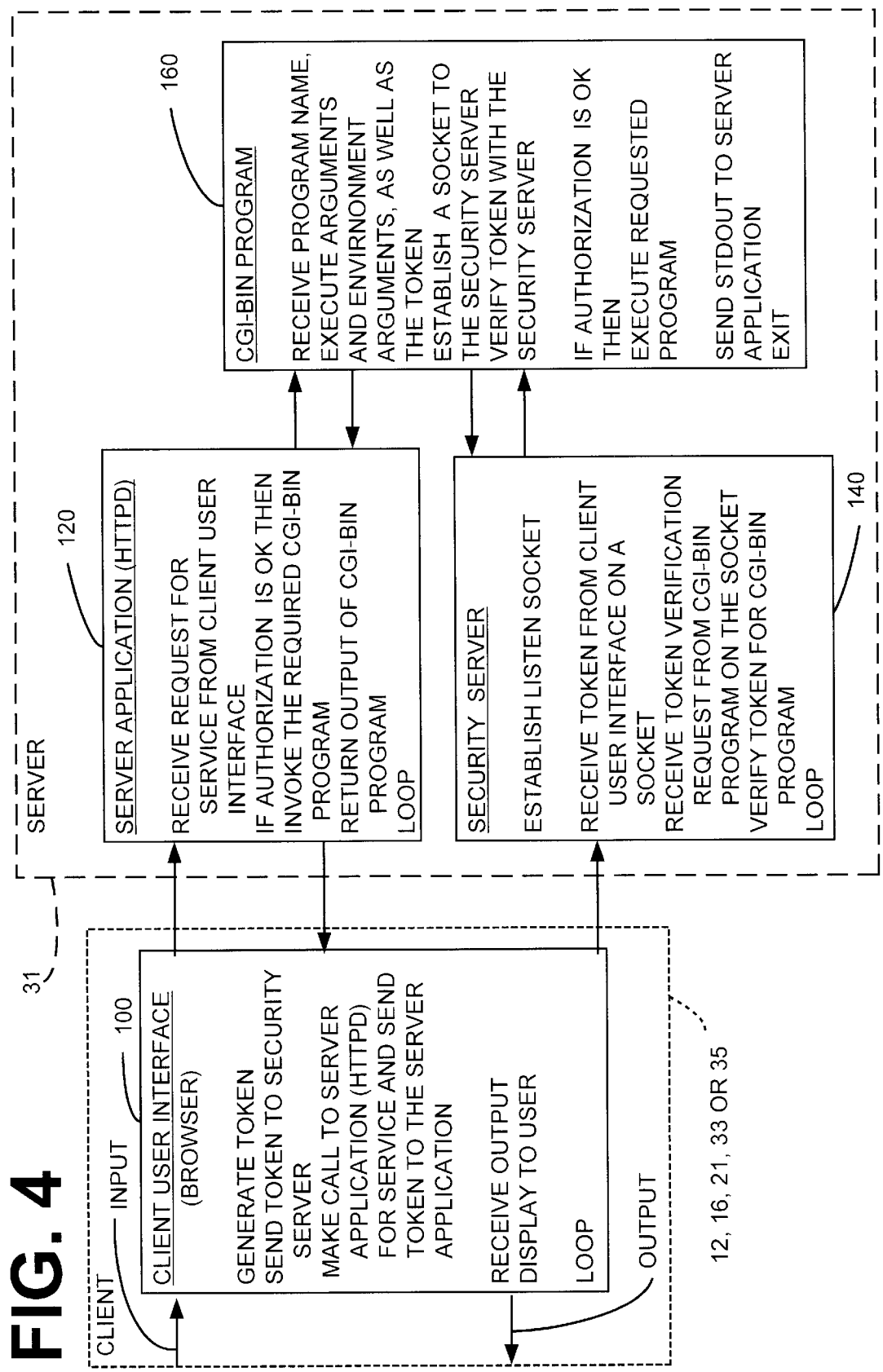
FIG. 4 is a block diagram illustrating the process for client browser, and the server's server application, CGI-BIN program, and the security server processes, as shown in FIGS. 2 and 3.

With regard to FIG. 4, the client system 12, 16, 21, 22, 33 or 34 can request services from the web server 31 by utilizing the client system browser program 100. The browser user interface program first receives a request from the user and checks to make sure that the user is authorized to access a particular function.

Next, the web browser generates a token by utilizing any suitable algorithm and generator. In the preferred embodiment, the token is not a sequential number, but is in fact a number generated by a random number generator.

The client user interface browser connects to the security server. This connection can be accomplished, for example, by using sockets. The client user interface 100 sends the token to the security server 140 utilizing the established connection. Next, the client user interface browser 100 makes a call to the service application for service and sends the token to the server application as one of the arguments for service requested. This request for service goes out on a network line to the server 31 and is received by the server application 120.

The server application 120 receives a request for service from the client user interface 100. Next, the server application 120 finds the requested program and calls the requested program by invoking CGI-BIN application 160 using the program name and arguments.

The CGI-BIN application program 160 receives the program name execution arguments. Prior to executing the requested subroutine that provides the requested service, the CGI-BIN program 160 establishes a socket with the security server 140. Once the socket is established with the security server 140, the CGI-BIN application program 160 sends a token verification request to the security server 140.

The security server 140 upon initialization establishes a listening socket. The security server 140 waits to receive a token from the client user interface 100 on the socket established on the connection created when the client user 100 was verified. Once a token is received from the client user interface, it is added to the security server's token verification table. The security server 140 waits to receive a token verification request from the CGI-BIN program 160 on a CGI-BIN token verification socket. When the request to verify a token is received from the CGI-BIN program 160, the security server 140 checks the token verification table and returns a message to the CGI-BIN program 160 as to whether or not the token has been received from the client user interface and therefore is a valid token.

When the CGI-BIN program 160 receives the token verification message from the security server 140, the CGI-BIN program 160 checks the authorization of the token. If the token authorization message received from the security server 140 is satisfactory, then the CGI-BIN program 160 executes the requested operation and writes the output to a stdout which is then returned to server application 120. If the token authorization message received from the security server 140 is unsatisfactory, then an error message is sent to the server application 120. When the output is sent to the server application 120, the CGI-BIN program 160 exits and therefore ceases to exist.

Server application 120 receives the output of the CGI-BIN application 160 and the exit status of the CGI-BIN application program process 160 and returns the output over a network to the client browser program 100. The browser program 100 then returns the output to the application program that requested service in the client system 12. This process will be further explained hereafter with regard to FIGS. 5–9.

Figure 5:
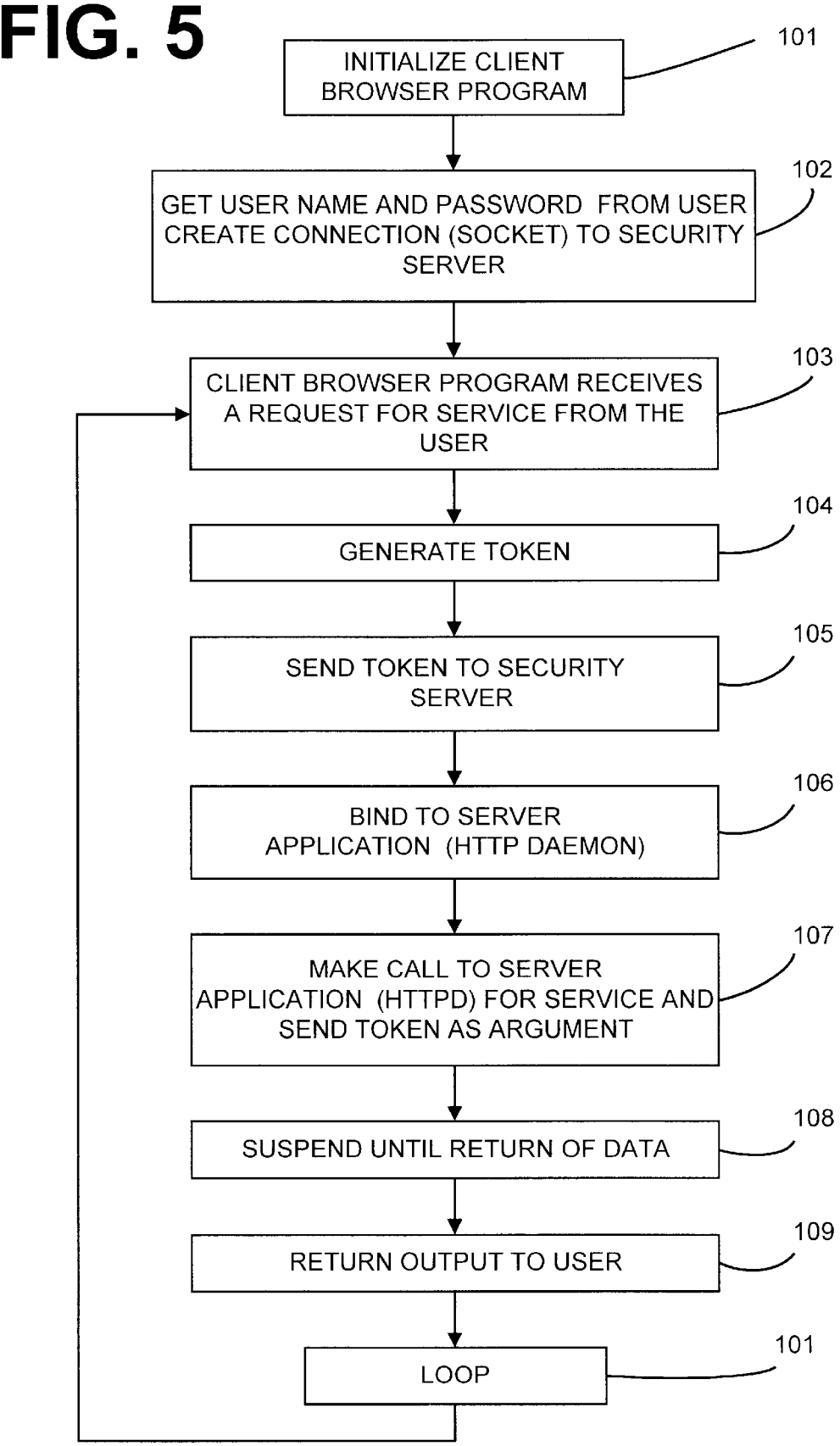
FIG. 5 is a flow chart of the process for the client browser of the present invention, as shown in FIG. 4.

The process implemented by the browser program 100 in the client system 12 is illustrated in FIG. 5. The first step of the browser program 100 is to initialize the client browser program 100 at step 101. The browser program 100 then accepts the login of the user name and password from the user and creates a connection to the security server 140 at step 102. The browser program 100 receives the request for service from the user at step 103.

The browser program 100 generates a token at step 104. In the preferred embodiment, the token is a random number generated from a random number generation function. However, it is known in the art that there are other methods for generating a unique token that can be utilized.

The user browser program 100 then sends the token generated in step 104 to the security server 140 at step 105. The browser program 100 receives the request for service from the user at step 103. The browser program 100 binds to the server application 120 at step 106. The browser program 100 makes a call to the server application 120 and sends the token as argument data at step 107 to the server application 120. The user browser program 100 is then suspended until the returning of data at step 108.

When data is returned to the client user interface, the browser program 100 is unsuspended at step 88 and the browser program 100 displays the data received from server application 120 to the user at step 109. The client user interface browser 100 then returns to step 103 and waits for the next request for service from the user.

Figure 6:
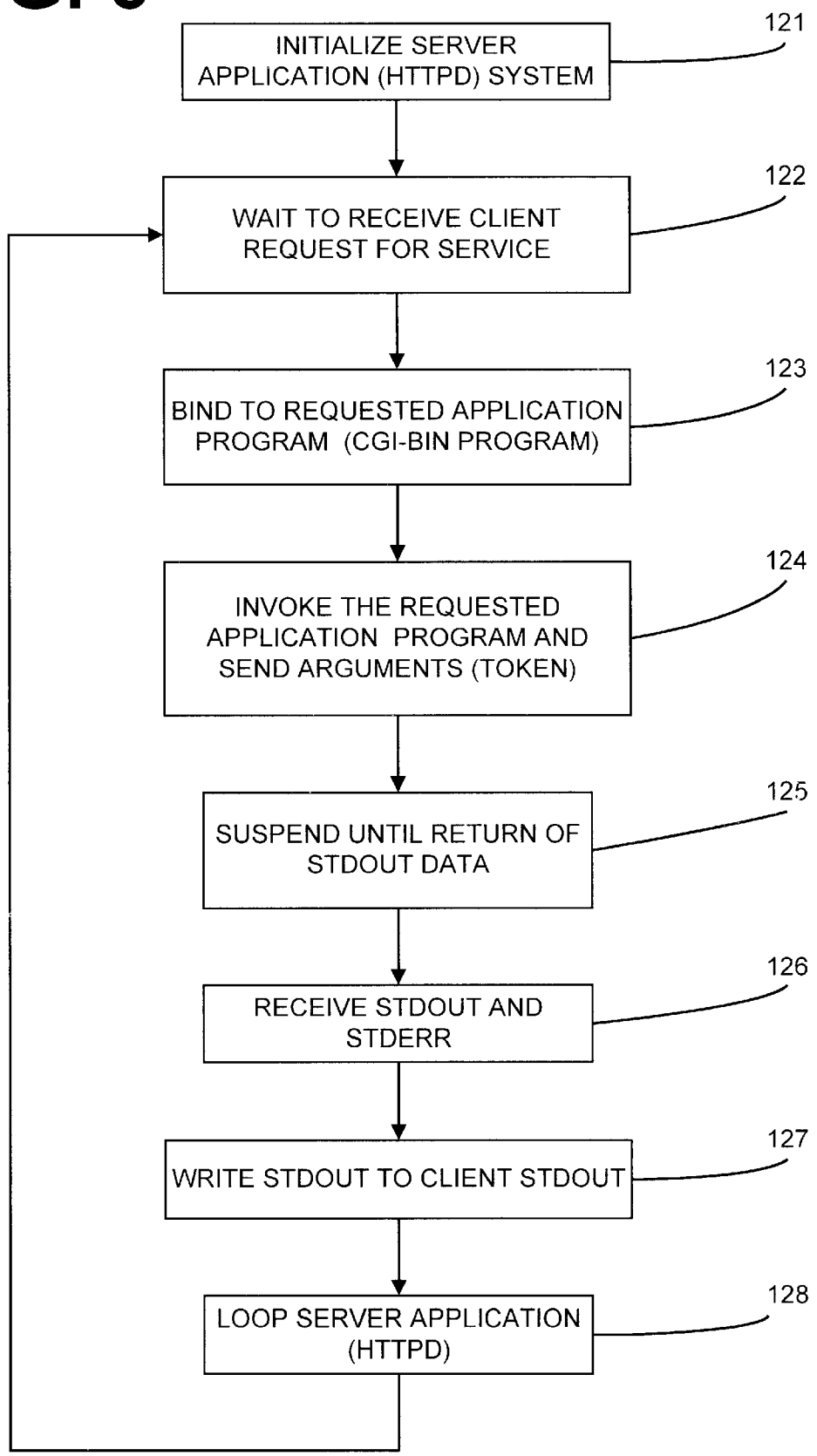
FIG. 6 is a flow chart of the process for the server's server application of the present invention, as shown in FIG. 4.

Illustrated in FIG. 6 is the flow diagram of the architecture and process implemented by the server application 120. The server application 120 is initialized at step 121. The server application 120 waits to receive a client request for service at step 122.

When a client request is received at step 122, the server application 120 determines which application program 100 will provide the service requested by the client system, and the server application 120 binds to the specified CGI-BIN application 160 at step 123. The server application 120 invokes the specified CGI-BIN application 160 with the specified arguments, one of which is the token, and sends the necessary data at step 124. The server application 120 process is suspended at step 125, until data is received from the specified CGI-BIN application 160.

When the output is received from the specified CGI-BIN application 160, the server application 120 receives the output at step 126. The server application 120 then writes the output received from the CGI-BIN application 160 and returns that output to the client requesting service at step 127. The server application 120 then exits that session, loops back to step 122, and suspends itself until a new request is received.

Figure 7:
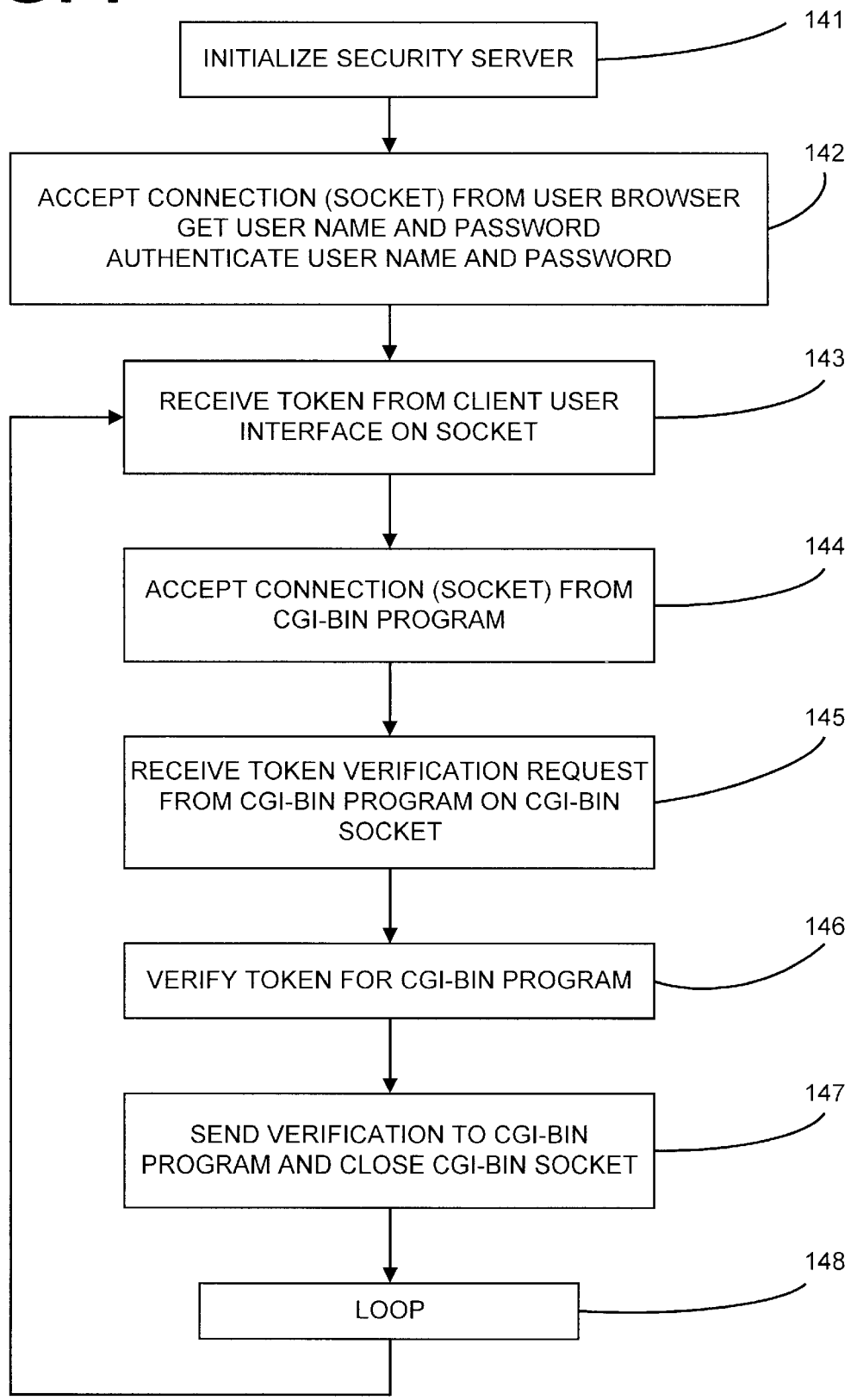
FIG. 7 is a flow chart of the process for the security server program of the present invention, as shown in FIG. 4.

With regard to FIG. 7 illustrated is shown the process of the security server 140. First, the security server 140 is initialized at step 141. Next, the security server 140 accepts a connection from a user browser 100 by getting the user login name and password at step 142. The security server 140 then authenticates the user name and password. Once the authentication of the login user name and password is complete, the security server 140 suspends until it receives a token from a client user interface on the socket connection at step 143.

The security server 140 accepts the connection socket from the CGI-BIN program 160 at step 144. Next, the security server 140 receives a token verification request from the CGI-BIN program 160 on the CGI-BIN socket at step 145. The security server 140 verifies the token received from the CGI-BIN program on the CGI-BIN socket with the token that was received from the client user interface on a socket at step 143.

If the tokens received at step 143 matches the token received at step 145, then the token verification is successful. If the token received from the client user interface on a socket at step 143 does not match the token received from the CGI-BIN program 160 at step 145, then the token verification fails. The security server 140 waits a predetermined period for the token verification request to arrive from the CGI-BIN program 160 before timing out. Any subsequent token verification request from the CGI-BIN program 160 on a token that is timed out results in a token verification failure.

The outcome of the token verification task is sent to the CGI-BIN program 160 at step 147 and security server 140 closes the CGI-BIN socket created at step 144. The security server then returns to step 143 to wait until it receives another token from a user client interface.

Illustrated in FIG. 8 is the flow diagram for the CGI-BIN application 160. First, the CGI-BIN application 160 is initialized at step 161. The CGI-BIN application 160 receives the request for the requested service with the program name and arguments, including the token, at step 163. The CGI-BIN application 160 establishes a socket to the security server 140 at step 163. In the preferred embodiment, a TCP/IP socket is established.

The CGI-BIN application 160 sends the token received from the server application 120 to the security server 140 for verification at step 164. The CGI-BIN program 160 suspends processing until the return of the token verification message from the security server at step 165.

Once the token verification message is received from the security server 140, a test is performed on the token verification at step 166. If the token was verified by the security server 140, then process flows to step 167 in which the CGI-BIN program 160 executes the requested service program. After the requested service program is executed at step 167, the CGI-BIN program 160 receives the stdout and standard error messages from the requested service program at step 168. The CGI-BIN program 160 sends the stdout and standard error data to the server application 120 at step 169 and then exits at step 172.

If the token verification check at step 166 results in the token not being verified, then the CGI-BIN program 160 sends an error message to the server application 120 indicating that the token verification with the security server 140 failed. The CGI-BIN application 160 then terminates its execution at step 172.

In an alternative embodiment, the CGI-BIN program 160 sends the security level of the command being executed to the security server 140 along with the token. The security server 160 verifies the token and it also checks the security level of the client user 100. To ensure the security server 140 is checking the right client user 100, the token would consist of the random number+the port number of the connection of the user interface to Security Server 140. The security level of the client user 100 is determined at the time the security server 140 authenticates the client user 100 on initial connection to the security server 140.

The foregoing description has been presented for purposes of illustration and description. It is not intended to be exhaustive or to limit the invention to the precise forms disclosed. Obvious modifications or variations are possible in light of the above teachings. The embodiment or embodiments discussed were chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly and legally entitled.

What is claimed is:

1. A method for securing Web resources in a network system, the method comprising the steps of:

generating a unique token each time a client browser receives a request for service;

transmitting said unique token to a security server each time the client browser responds to the request for service;

transmitting the request for service and said unique token to an application server to satisfy the request for service, wherein the application server forwards said unique token to the security server to verify said unique token;

receiving a requested service from the application server when a match notice from the security server indicates to the application server, that said unique token from the client browser and said unique token from the application server match; and receiving an error message from the application server when a predetermined timeout period expires between when said unique token is received from the client browser and when said second unique token is received from the application server.

2. The method of claim 1, wherein the step of generating a unique token further includes the step of:

utilizing a random number generator to generate the unique token.

3. The method of claim 2, wherein the step of generating a unique token further includes the step of:

determining a port number for the security server connection to the client browser; and adding the port number to said unique token.

4. The method of claim 1, further comprising the step of:

registering the client browser with the security sever.

5. A system for securing Web resources in a network system, comprising:

means for generating a unique token each time a client browser receives a request for service;

means for transmitting said unique token to a security server each time the client browser responds to the request for service; and means for transmitting the request for service and said unique token to an application server to satisfy the request for service, wherein the application server forwards said unique token to the security server to verify said unique token;

means for receiving a requested service from the application server when a match notice from the security server indicates to the application server that said unique token from the client browser and said unique token from the application server match; and means for receiving an error message from the application server when a predetermined timeout period expires between when said unique token is received from the client browser and when said second unique token is received from the application server.

6. The system of claim 5, wherein said means for generating a unique token further comprises:

means for determining a port number of a connection of the client browser to the security server;

means for using a random number generator to generate a random number; and means for adding said port number to said random number to create said unique token.

7. The system of claim 5, further comprising:

means for registering the client browser with the security server to obtain a port number.

8. A client device for providing security to web resources, comprising:

a first client mechanism for generating a unique token each time the client device sends a request for service to an application device;

a second client mechanism for transmitting the unique token to a security device to provide third party validation;

a third client mechanism for transmitting the unique token with said request for service to the application device, wherein the application device forwards said unique token to the security device to validate said unique token;

a fourth client mechanism for receiving a requested service from the application device when a match notice from the security device indicates to the application device, that said unique token from the client device and said unique token from the application device match; and a fifth client mechanism for receiving an error message from the application device when a predetermined timeout period expires between when said unique token is received from the client device and when said second unique token is received from the application device.

9. The system of claim 8, wherein said first client mechanism further comprises:

a sixth client mechanism for determining a port number of a connection of the client device to the security device;

a seventh client mechanism for using a random number generator to generate a random number for said unique token; and a eighth client mechanism for adding the port number to said random number to create said unique token.

10. The system of claim 8, further comprising:

a ninth client mechanism for registering the client device with the security device to obtain a port number.

11. A security server for securing resources in a network, comprising:

means for receiving a unique token from a client browser, said unique token is different each time the client browser generates a request for service;

means for receiving a second unique token from an application server to verify said request for service from the client browser;

means for comparing said unique token received from the client browser and said second unique token received from the application server;

means for generating a match notice when said unique token received from the client browser and said second unique token received from the application server match, the match notice authorizing the application server to provide a requested service to the client browser when the match notice is received;

means for generating a nonmatch notice when a predetermined timeout period expires between when said unique token is received from the client browser and when said second unique token is received from the application server, the nonmatch notice prohibiting the application server to provide the requested service to the client browser when the nonmatch notice is received; and means for transmitting the notice generated to the application server to indicate if said request for service is verified.

12. The security server of claim 11, wherein said means for generating a nonmatch notice also generates said nonmatch notice when said unique token received from the client browser and said second unique token received from the application server do not match.

13. A system for providing security of web resources to a client device that generates a unique token each time the client device generates a request for service, and an application device for providing a requested service; said computer system comprising:

a security device for verifying the unique token generated by the client device with the request for service, wherein said security device further comprises:

a first security mechanism that compares the unique token received from the client device and a second unique token received from the application device;

a second security mechanism that generates a match notice when the unique token received from the client device and the second unique token received from the application device match, the match notice authorizing the application device to provide the requested service to the client device when the match notice is received; and a third security mechanism generating a nonmatch notice when a predetermined timeout period expires between when the unique token is received from the client device and when the second unique token is received from the application device, the nonmatch notice prohibiting the application device to provide the requested service to the client device when the nonmatch notice is received.

14. The system of claim 13, wherein said third security mechanism generates said nonmatch notice when said unique token received from the client browser and said second unique token received from the application server do not match.

15. The system of claim 13, further comprising:

a fourth security mechanism for receiving the unique token from the client browser device; and a fifth security mechanism for receiving the second unique token from the application device.

16. The security system of claim 13, further comprising:

a fifth security mechanism for transmitting the notice generated to the application server to indicate if said request for service is verified.

17. A method for a security server to secure Web resources in a network system, the method comprising the steps of:

receiving a unique token from a client device each time the client device generates a token in response to a request for service;

receiving a verification request for a second unique token from an application server;

comparing the unique token received from the client device and the second unique token received from the application server;

generating a match notice when the unique token received from the client device and the second unique token received from the application server match, the match notice authorizing the application server to provide the requested service when the match notice is received; and generating a nonmatch notice when a predetermined timeout period expires between when the unique token is received from the client device and when the second unique token is received from the application server, the nonmatch notice prohibiting the application server to provide the requested service when the nonmatch notice is received.

18. The method of claim 17, further including the step of: generating said nonmatch notice when said unique token received from the client browser and said second unique token received from the application server do not match.

19. The method of claim 17, further including the step of:

transmitting the generated notice to the application server.

20. The method of claim 17, further including the step of:

receiving a registration request from the client device; and authenticating the registration request.

* * * * *